United States Patent

[11] 3,623,032

[72] Inventor Sergiu Schapira
Brookline, Mass.
[21] Appl. No. 11,502
[22] Filed Feb. 16, 1970
[45] Patented Nov. 23, 1971
[73] Assignee Honeywell, Inc.
Minneapolis, Minn.

[54] KEEPER CONFIGURATION FOR A THIN-FILM MEMORY
2 Claims, 3 Drawing Figs.

[52] U.S. Cl. .......... 340/174 BC, 340/174 PW, 340/174 JA, 340/174 TF, 340/174 M
[51] Int. Cl. .......... G11b 7/02, G11b 11/14, G11b 5/04
[50] Field of Search .......... 340/174 TF, 174 PW, 174 BC, 174 JA

[56] References Cited
UNITED STATES PATENTS
3,534,343 10/1970 Sallet .......... 340/174 PW
OTHER REFERENCES
IBM Technical Disclosure Bulletin, " Multilayer Film Keeper," Vol. 8, No. 11, April 1966, p. 1,617, 340–174 BC.

*Primary Examiner*—James W. Moffitt
*Assistant Examiner*—Steven B. Pokotilow
*Attorneys*—Charles J. Ungemach, Ronald T. Reiling and James A. Phillips

ABSTRACT: A magnetic memory device has a number of substantially parallel elongated memory elements arranged within a plane and extending transverse to and magnetically coupled with a group of conductors parallel to the plane. The conductors are disposed on a dielectric sheet spaced from the memory elements. A soft layer of magnetic material covers one side of the dielectric sheet. On the opposite side of the dielectric sheet, strips of soft magnetic material are disposed between the conductors. This side of the dielectric sheet is secured to the plane of memory elements.

PATENTED NOV 23 1971 3,623,032

INVENTOR
SERGIU SCHAPIRA
BY Leo Stanger
ATTORNEY

KEEPER CONFIGURATION FOR A THIN-FILM MEMORY

BACKGROUND

This invention relates to a magnetic memory device for computers or the like and a method for making it, and more particularly to a memory device and method for making it which utilizes elongated magnetic elements for storage of information.

Wires plated with magnetic material have been used as elongated memory elements for information storage. The advantages of such a technological development have now been established. The most significant advantages have been the nondestructive readout of stored data and the ability to write in data electronically at high speeds. The basic structure of a plated wire memory element consists of a length of conductive wire coated with a magnetic film. The magnetic film is deposited on the cylindrical surface of the wire in a continuous plating process. The film is magnetically divided into cylindrical memory elements. A single memory element storing one bit is perhaps 50 mils in length. Several hundred bits can be stored on each of the many wires making up the memory. Also, conductive lines extend transverse to and isolated from the plated wires. Bit positions are formed at the intersection of the conductive lines with the plated wires. For effective reading and writing within these bit positions, such conductive lines, or as they are more commonly called word lines or straps, are magnetically coupled with the plated wire memory elements.

Reading and writing in a plated wire memory is controlled by means of currents through a given plated wire and word strap. A current applied to a plated wire provides a magnetic field within the magnetic film in its circumferential direction. A second current applied to a work strap, normally surrounding and orthogonal to the wire, establishes a magnetic field in the axial direction of the wire. To write data into the memory, the two currents are applied coincidentally. This results in storage within the bit location in the easy direction of the magnetic material. Since the easy direction during the plating process is usually established in the circumferential direction, the polarity of the current through the plated wire determines whether the bit stored is a one or a zero. To read stored information within a given bit location, one need only apply a current through the word strap, thus inducing a longitudinal component of magnetization in the magnetic film, which tilts the magnetization vector from its rest position in the easy direction toward the hard axis of magnetization. Such a change of flux generates a pulse in the plated wire which in turn may be read by sense amplifiers connected to the plated wire. At the end of the current pulse, the vector returns to its original position. Hence, the process of reading out does not destroy the stored information within a given bit location.

While the advantages of a plated wire memory have long been apparent, such a memory configuration does have continuing problems of interference and creep between adjacent bits. Such interference and creep are caused by stray fields emanating from the active word straps.

It is thus an object of the present invention to provide a magnetic memory which alleviates the problems if interference and creep.

It is a further object of the present invention to provide a magnetic memory which utilizes elongated memory elements for storage information.

It is yet another object of the present invention to provide a magnetic memory which provides for a nondestructive readout of stored data and has the ability to write new data electronically at high speeds.

It is still another object of the present invention to provide a magnetic memory which lends itself to wide application and high performance.

It is also an object of the present invention to provide a method of fabrication of a magnetic memory which insures ease and low cost of manufacture, efficiency of memory packaging, a high density of bit storage, a compact and sturdy storage device.

Other objects of the invention will be evident from the description hereinafter presented.

SUMMARY OF THE INVENTION

The invention provides a memory plane in which a number of closed-flux-path elongated magnetic elements are arranged in a row formation, substantially parallel with one another. Also within the plane are located a number of conductive elements which extend transverse to the memory elements and are magnetically coupled to them. The conductive elements are maintained equidistant from one another and within the same plane by a supporting dielectric sheet. The dielectric sheet is spaced from the magnetic elements so as to form a reference surface by which the conductors are insulated from the magnetic elements and spaced equidistant therefrom. A dielectric material fills the space between the magnetic elements and the conductor-supporting dielectric sheet. A layer of soft magnetic material entirely covers the side of the dielectric sheet away from the magnetic elements. Strips of a soft magnetic material are located on the reverse side of the sheet covering those portions of the sheet between the conductive elements.

The conductive elements may be carried by either the side of the dielectric sheet away from the magnetic elements or that side nearest the memory elements. The bits of memory storage are located at the intersections of the magnetic and conductive elements. The magnetic elements may, for example, comprise a conductive wire coated with a uniform layer of magnetic material.

When current is applied to any one of the conductive elements, the field emanating from it is confined to a low reluctance path as a result of the soft magnetic layer and the magnetic strips bordering the conductive element. Thus, the stray magnetic field at each intersection is considerably reduced, so that it does not adversely affect the information stored within any of the adjacent bit locations.

Because of the above features, the word straps may be closely spaced from one another to attain a higher bit density of memory packing. Moreover, the localization of the work field to a given bit location enhances the reliability of the memory operation.

Still another advantage is that the magnetic strips of soft magnetic material in combination with the soft magnetic layer optimizes the magnetic path distribution around the word strap, thereby allowing for the use of smaller word currents.

Yet another advantage of the present invention is that the use of the magnetic strips reduces the capacitive effects which retard switching speeds within the storage location by providing for closer magnetic coupling between the word straps and the magnetic elements.

Furthermore, the additional advantage of reducing interference and creep between adjacent bits within a given memory element is realized.

The invention also provides a method for manufacturing the above described memory plane. The magnetic memory elements may be disposed within the dielectric material in any one of a number of conventional ways, one of which is described by Hoffman in the U.S. Pat. No. 3,175,200. The conductive elements are etched by additive or subtractive techniques upon the dielectric sheet. On one side of the dielectric sheet, on portions between the conductive elements, are etched the magnetic strips. The soft magnetic layer is coated on the opposite side of the sheet. Finally, the dielectric sheet, bearing the soft magnetic materials and the conductive elements, is laminated or bonded to the dielectric material which contains the magnetic memory elements.

These and other features which are considered to be characteristic of this invention are set forth with particularity in the appended claims. The invention itself, however, as well as additional objects and advantages thereof, will best be understood from the following description when considered in conjunction with the accompanying drawings.

DESCRIPTION OF THE PREFERRED EMBODIMENT

Figure 1:
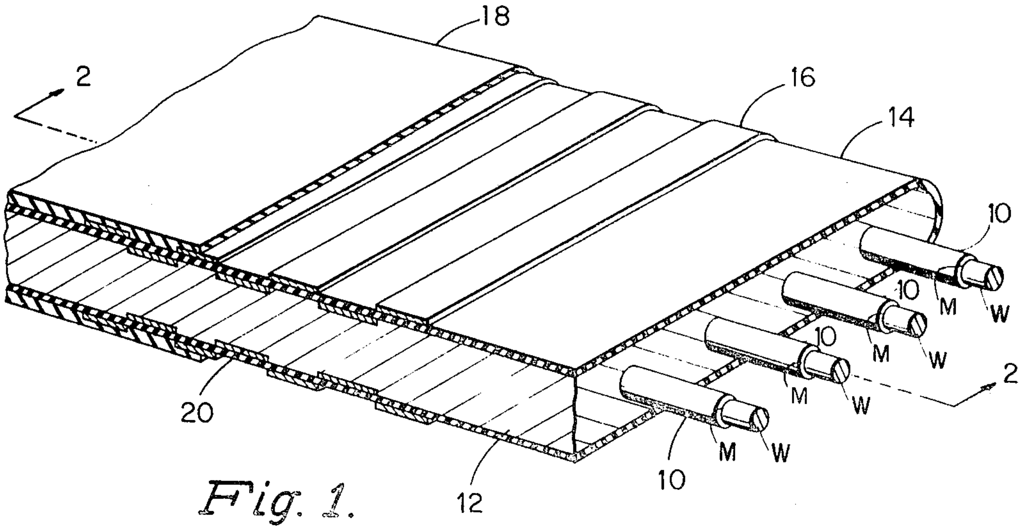
FIG. 1 is a perspective view of the basic memory structure which embodies features of the invention.

The basic memory structure of the device according to the invention is represented in FIG. 1. Within the structure is located a plane of memory elements 10 which lie substantially parallel and equidistant from one another. These memory elements preferably are composed of conductive wires W coated with a layer of magnetic material M, which is to serve as the storage medium within the memory structure. An anisotropic magnetic material capable of having induced therein an easy direction of magnetization in the circumferential direction is preferable for this application.

The magnetic elements 10 are bounded by the structure core of dielectric material 12. The function of the dielectric material 12 is to provide thermal and electrical insulation for the memory elements 10. A sheet of dielectric material 14, having a greater degree of strength than the dielectric material 12, is laminated or bonded to the outer surfaces of the dielectric material 12. The dielectric sheet 14 serves as a strengthening member for the memory structure. The dielectric sheet 14 lies substantially within a plane parallel to that plane defined by the magnetic elements 10.

Conductive elements or word straps 16 are supported by the dielectric sheet 14. The word straps 16 extend substantially orthogonal to the magnetic elements 10 and are equidistant from one another. In FIG. 1, the word straps 16 are shown extending on one side of the structure and turning to the other side of the structure to return across a likewise turned portion of the dielectric sheet 14. Both portions of a given word strap 16 lie in a plane perpendicular to the surface of the dielectric sheet 14.

A layer of soft magnetic material 18 covers the conductor-supporting side of the dielectric sheet 14, filling the spaces between the word straps 16. On the opposite side of the dielectric sheet, magnetic strips 20 of a soft magnetic material with a high permeability are located upon the portions of the dielectric sheet 14 between the word straps 16. The soft magnetic material used in each instance is characterized by a high permeability, and may be a material such as permalloy. The magnetic strips 20, at their points of intersection with the plated wire memory elements 10, are contiguous with the magnetic film M constituting the outer layer of the memory elements 10.

Figure 2:
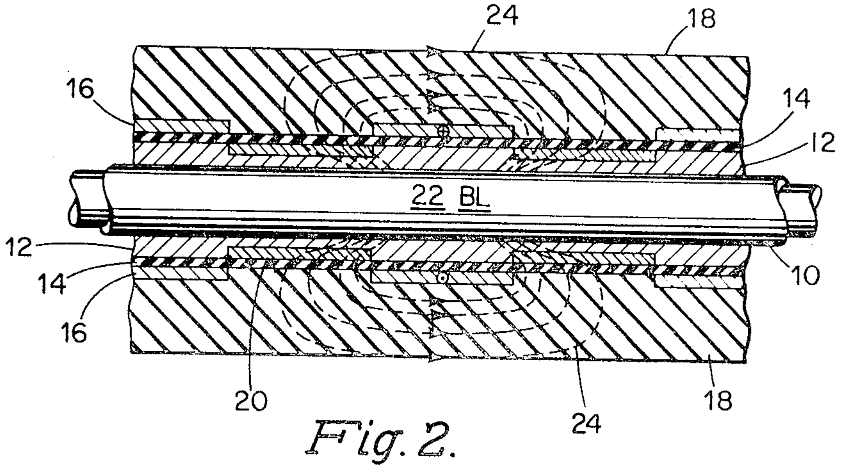
FIG. 2 is a cross-sectional view of the memory plane in FIG. 1 showing the low reluctance path of the magnetic fields emanating from a conductive element.

The configuration of the soft magnetic layer 18 and the magnetic strips 20, bordering the conductive elements 16, augments the field from a conductive element 16 at a bit location 22 by providing a low reluctance path 24, as shown in FIG. 2. As a result, the magnetic flux is confined to each bit location; thus reducing the stray fields which would otherwise effect adjacent bit locations. The direct advantage attained in employing "keepers" in this manner is the ability to achieve a higher packing density of storage locations and an improvement in the electrical and magnetic properties of the memory device.

To manufacture the above-described memory, magnetic memory elements 10 may be disposed within the dielectric material 12 in the manner described by Hoffman in the U.S. issued U.S. Pat. No. 3,175,200. Tunnel-forming wires are stretched across a loom in a parallel planar array. The wires when stretched become straight and are arranged to be of the same diameter as the external diameter of the memory elements 10. The dielectric material 12 in a liquid state is then poured into the loom around the tunnel-forming wires and allowed to harden. A resin or epoxy would be suitable for this purpose. After the dielectric material 12 has hardened, the embedded wires are stretched further, without exceeding their yield point, so that they may be withdrawn from the dielectric material 12. The memory elements 10 are then inserted within the tunnels thus created.

According to a feature of the invention, before the dielectric sheet is mounted, the conductive elements 16 are etched by additive or subtractive techniques upon the dielectric sheet. 14. Preferably, a sheet of polyester material is to be used. One of such is available under the trademark Mylar. On the opposite side of the dielectric sheet 14, for positioning between the conductive elements 16, are etched the magnetic strips 20. The soft magnetic layer 18 is coated on the opposite side of the sheet covering the exposed surfaces of the dielectric sheet 14 and the conductive elements !6. Finally, the dielectric sheet 14, bearing the soft magnetic layer 18, the conductive elements 16, and the magnetic strips 20, is laminated or bonded to the dielectric material 12, which contains the magnetic memory elements 10. The magnetic straps 20 are pressed into the dielectric material 12 during the bonding or lamination process and are therefore made to lie adjacent the memory elements 10.

The use of the dielectric sheet 14 as a reference surface for the deposition of the conductive elements 16 and the magnetic strips 20 provides for an integral memory plane with reliable magnetic coupling between the conductive elements 16 and the magnetic elements 10, as well as providing for a strengthened memory device.

Figure 3:
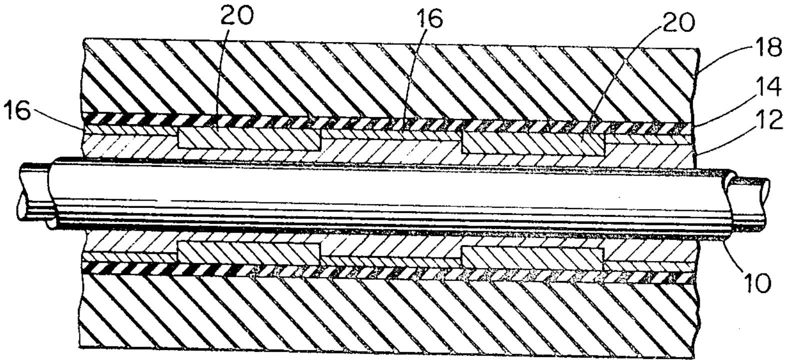
FIG. 3 is a cross-sectional view of an alternative embodiment of the memory plane in FIG. 1.

An alternative embodiment of this invention is shown in FIG. 3, where the word straps 16 are etched on the same side of the dielectric sheet 14 as are the magnetic strips 20. The same advantages as are described above obtain from this configuration.

Obviously, many modifications of the present invention are possible in the light of the above teaching. It is therefore to be understood that, in the scope of the appended claims, the invention may be practiced otherwise than as specifically described.

What is claimed is:

1. A plated wire memory plane, having magnetic coated conductive wires as memory elements and spaced conductive word straps which generate magnetic fields for storage and retrieval of information in the memory elements, comprising the improvements of A. a dielectric sheet
   1. having first and second surfaces
   2. disposed between said memory elements and said spaced conductive straps, and
   3. defining with its first surface opposite the memory element a reference surface to which said conductive straps are secured, B. a magnetic keeper which covers the exposed surfaces of said conductive straps and extends between said straps, C. strips of soft magnetic material
   1. of a high permeability
   2. disposed on the second surface of said dielectric sheet opposite only the spaces between the conductive straps, and
   3. contiguous with said memory elements such that closed, low-reluctance paths are developed around each of said word straps and through the magnetic coating of the memory elements.

2. A magnetic memory device comprising a plane of dielectric material with a finite thickness;

a first grid of memory elements embedded within said plane;

a second grid of spaced conductor means transverse said first grid;

a dielectric sheet, one side of which carries said second grid;

a layer of soft magnetic material covering the exposed surfaces of the conductor means and filling the spaces between said conductor means;

strips of soft magnetic material disposed on a second side of said sheet opposite only the spaces between said conductor means; and said second side of the sheet lying adjacent said plane of dielectric material.

* * * * *